F. M. CARD.
CLUTCH AND STOP MECHANISM.
APPLICATION FILED FEB. 9, 1920.
1,429,404.
Patented Sept. 19, 1922.
2 SHEETS—SHEET 2.
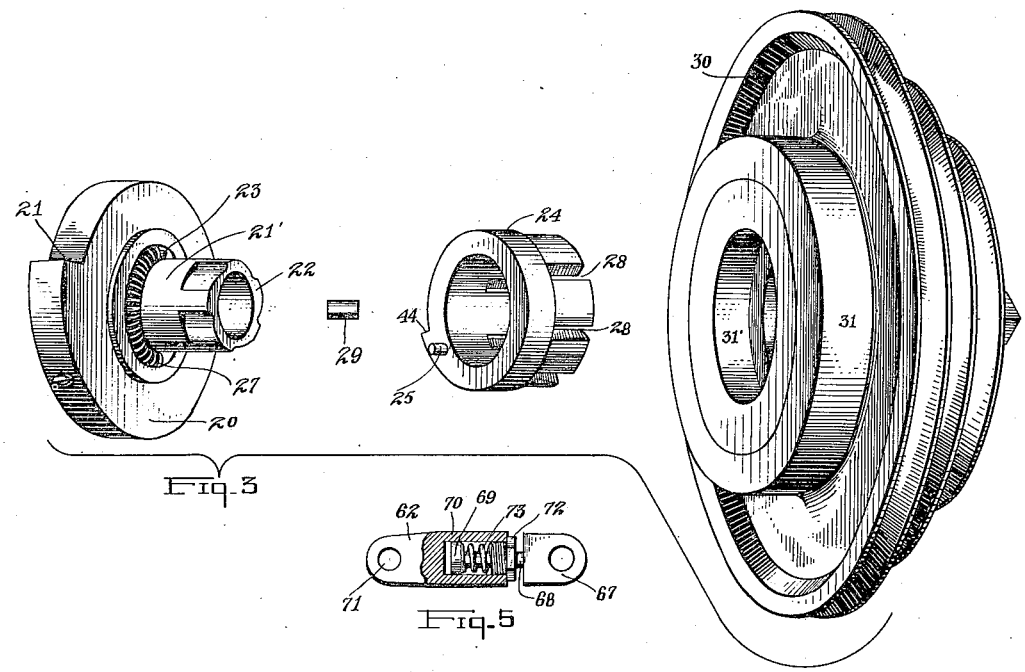
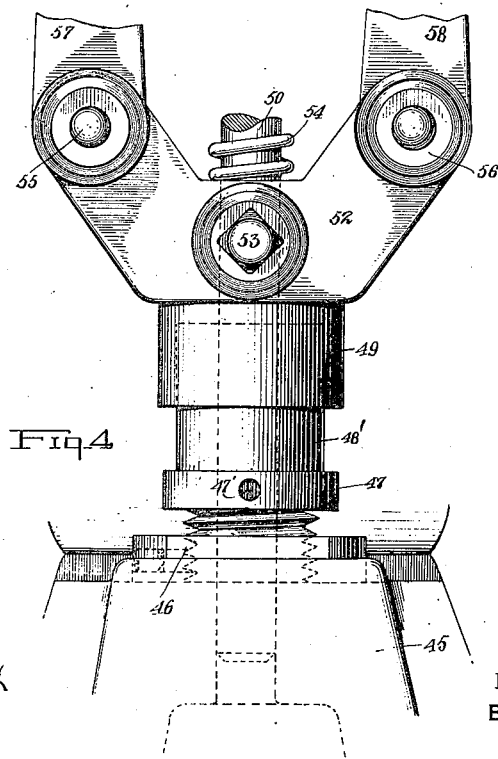
WITNESSES
INVENTOR
FREDERIC M. CARD
BY
ATTORNEY Patented Sept. 19, 1922.

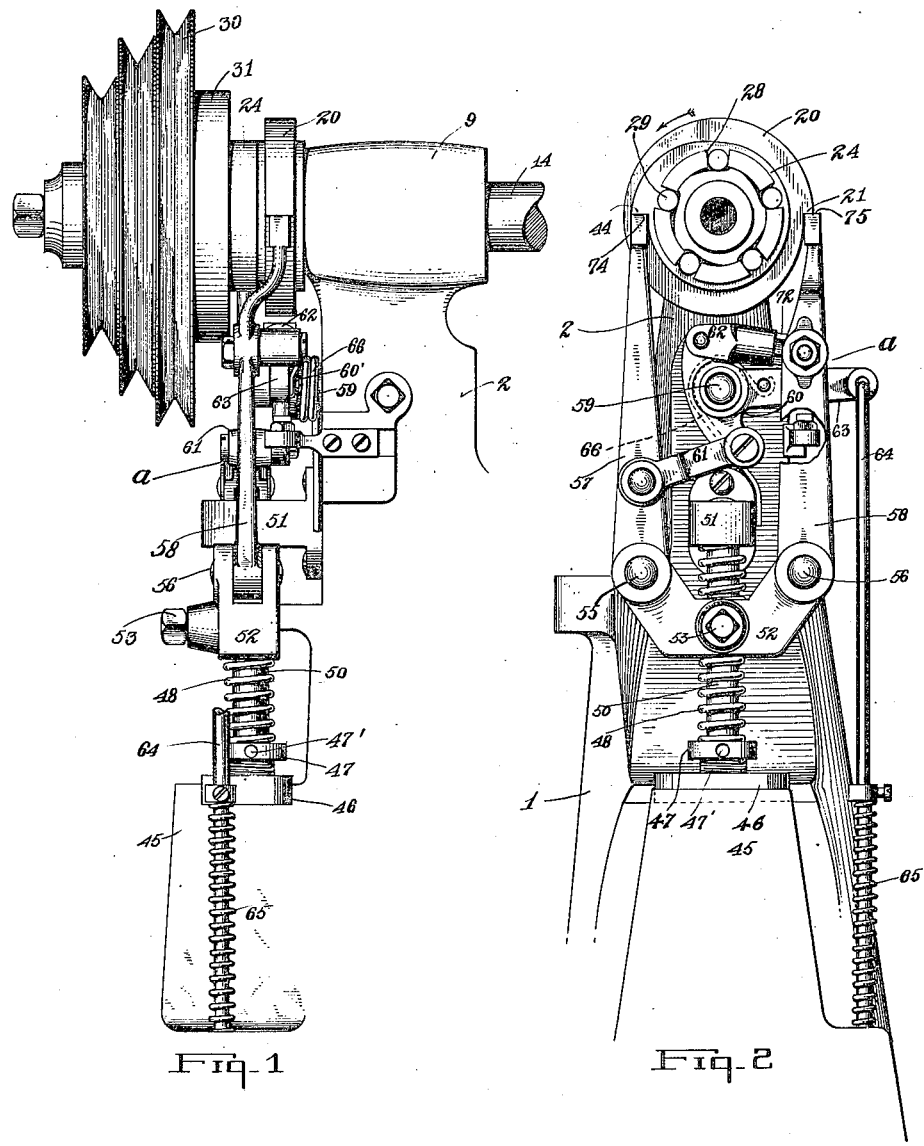

1,429,404

UNITED STATES PATENT OFFICE.

FREDERIC M. CARD, OF BRIDGEPORT, CONNECTICUT, ASSIGNOR TO THE SINGER MANUFACTURING COMPANY, OF ELIZABETH, NEW JERSEY, A CORPORATION OF NEW JERSEY.

CLUTCH AND STOP MECHANISM.

Application filed February 9, 1920. Serial No. 357,380.

*To all whom it may concern:*

Be it known that I, FREDERIC M. CARD, a citizen of the United States, residing at Bridgeport, in the county of Fairfield and State of Connecticut, have invented certain new and useful Improvements in Clutch and Stop Mechanisms, of which the following is a specification, reference being had therein to the accompanying drawings.

This invention relates to clutching and stopping mechanism for controlling the rotation of a driven shaft intended to be applied to a machine such as an eyeleting or sewing machine or to any other machine where it is found desirable to stop a driven shaft at a fixed point in its rotation, starting and stopping thereof occurring at frequent intervals.

This invention seeks to provide in connection with the driving clutch, means for positively stopping and locking the driven shaft at a fixed point in the cycle of operation of the parts moved thereby and without undue shock and strain upon adjacent parts of the mechanism, the present invention belonging to that type of mechanism disclosed in the application of George M. Eames, Ser. No. 199,486, filed October 31, 1917, being a modification, and for some purposes an improvement thereon.

Other and additional objects and advantages of the invention, together with improved details of construction and improved combinations of parts will be hereinafter more particularly described and claimed.

For a more complete understanding and appreciation of these and other features of the invention reference may be had to the description of the preferred embodiment thereof selected for purposes of illustration and shown in the accompanying drawings, in which,—

Fig. 1 is a front elevation of the mechanism as applied to the main drive shaft of the machine;

Fig. 2 is an end elevation with portions removed to show parts otherwise hidden and with the clutch elements in neutral position;

Fig. 3 is a detail view of the clutch elements disassembled;

Fig. 4 is an enlarged detail showing a modified form of the cushion elements; and Fig. 5 is a detail partly in section showing an extensible link.

1 indicates the base of the machine to which the improved stop mechanism is applied and 2 is a bracket rising from the base, 1, said bracket being provided with a bearing 9 for the main drive shaft 14 of the machine. Located upon the drive shaft adjacent the bearing 9 is a drive mechanism including a clutch indicated generally by reference letter *a*. The clutch mechanism may be of any suitable type, but is here shown as of the form known as the "Horton" clutch, an example of which may be seen in the patent to Horton, No. 260,394, July 4, 1882. The clutch herein disclosed comprises a collar 20 fixed upon the shaft, said collar being provided with a stop lug or shoulder 21, a bearing boss 21', a multiple cam portion 22 and a pin 23. Cooperating with said collar is a clutch ring 24 rotatably mounted upon the boss 21' and provided with an outstanding pin 25.

Collar 20 is provided with a recess for a spring 27, said spring bearing at its opposite ends upon the respective pins 23 and 25. Pins 23 and 25 may be at different radial distances from the center of the supporting shaft and by this arrangement the spring can be readily inserted within the receiving cavity of member 20, one end bearing upon the pin 23 and clutch ring 24 may thereafter be mounted upon the bearing boss 21', the pin 25 freely passing the pin 23 to engage the other end of the spring, this arrangement, however, not being essential. Clutch ring 24 is provided with a plurality of slots 28 forming receptacles for the clutching rolls 29 which slide freely therein. 30 indicates a drive pulley having a hollow boss 31, the latter providing a clutching surface 31' for engagement with the clutch rollers 29 when the latter are thrown into clutching relation, the pulley being loosely mounted upon the drive shaft adjacent the collar 20 and having its boss so positioned as to enclose the portion of the clutch ring 24 comprising slots 28.

On the base of the machine, directly below the location of the clutch member is a lug 45 having a slotted top face. Mounted in the slot is a bearing member 46 having screw threaded therein the lower end of an abutment member 47 which may be fixed in vertically adjusted position therein by means of a suitable set screw, holes 47' being provided in member 47 for the insertion of a tool or rod for turning the same to adjust its height. A rod 50 is slidably mounted in a vertical opening through member 47 and at its upper end is guided in a bearing opening in a bracket 51 fixed to the frame of the machine. Suitably carried on rod 50 is a yoke member 52, this member being shown as adjustably fixed upon the rod by set screw 53. Located between the abutment 47 and the lower face of yoke member 52 is a coil spring 48, and between bracket 51 and the top face of the yoke is a second coil spring 54, the latter spring serving to constantly keep yoke 52 in engagement with the top of spring 48. Instead of spring 48 the cushion shown in Fig. 4 may be used if desired, this cushion consisting of a thick annular washer of resilient material as 48' seated on abutment 47 at its lower end and having a cap or cover 49 between the top thereof and yoke member 52 and preferably passing down from it surrounding the outside of the washer 48'. Pivotally mounted upon the ends of the yoke member at points 55 and 56 respectively are the primary and auxiliary stop arms 57, 58. The primary stop-arm is designed to arrest the forward motion of the drive shaft and the auxiliary stop-arm to sustain the subsequent recoil under the action of the spring 27.

Mounted on a fixed pivot 59 between the arms 57 and 58 is a bell crank lever 60, one arm of which is attached by link 61 to stop arm 57, a shorter arm being connected by an extensible link 62 with the stop arm 58, and a third arm 63 being connected by means of a rod 64 preferably to a suitable treadle mechanism. A spring 65 serves to maintain rod 64 normally at its upper limit of travel and a spring 66 is coiled about pivot 59 bearing at one end against boss 51 and bearing at its other end on screw 60' of the bell crank lever 60 serving to urge lever 60 in a direction to force the stop arms 57, 58 toward each other.

Extensible link 62, as shown in Fig. 5, consists of an abutment member 67 pivotally connected to the stop arm 58 and having a guiding stud 68, provided with a boss 69 at its outer end. A sleeve 70 is pivoted at 71 to the bell crank 60 and slides externally on the boss 69. A screw threaded closure member 72 having an opening for the passage of the stud 68 is screwed into the extremity of the sleeve member 70 and serves to retain a coil spring 73 between its inner end and the boss 69, normally urging the sleeve and closure member 72 into engagement with the abutment 67. The stop arms 57 and 58 are provided at their free extremities with stop surfaces 74 and 75 adapted to engage with the stop lugs 44 of clutch ring 24 and 21 of collar 20 respectively.

The operation of this mechanism is as follows: In Figs. 1 and 2 the machine is shown as at rest, the stop arms being in engagement with the stop lugs of the clutch device, clutch rolls 29 being shown in neutral position. At this time the spring 27 is under compression tending to turn the clutch member 24 with respect to the collar 20, but is restrained from such movement by engagement of the stop devices. On rocking bell crank lever 60 by depression of the rod 64 links 61 and 62 are pushed outwardly, separating the free extremities of stop arms 57 and 58 and disengaging them from the stop lugs. At the instant of release of the lug 44 from its stop arm the spring 27 expands, thereby causing a partial rotation of the clutch ring 24 in a counter-clockwise direction, as shown in Fig. 2. This movement causes the rolls 29 to ride up upon the cam surfaces of the cam portion 22 and thereby clutches the constantly rotating pulley 30 to the drive shaft permitting a positive drive of the same. Upon release or reverse actuation of the treadle or other means for controlling the bell crank lever 60, springs 65 and 66 rock the bell crank in the opposite direction, pulling arm 57 inwardly positively and arm 58 inwardly yieldingly through the action of the spring 73 into the paths of their respective stop lugs. By engagement with the lug 44 of the stop arm 57, the ring 24 is stopped and the cams 22 ride out from beneath the clutch rolls 29 thereby releasing the driving shaft. The momentum of the machine continues the rotation of collar 20, puts the spring 27 under tension and carries the stop lug 21 past the upper end of stop arm 58 which immediately snaps thereunder by the action of the spring 73. When the momentum of the shaft has been exhausted in applying tension to the spring 27 the forward motion stops and the spring 27 then urges the shaft in a reverse direction, thus rotating collar 20 backwardly until the lug 21 impinges on the top of the stop arm 58 which stops further reverse rotation of the shaft.

From the foregoing description it will be observed that the bellcrank or rocking element 60 constitutes an actuating element which derives its movements toward stopping position from the springs 65 and 66 acting in opposition to the necessarily weaker spring 73 of the link 62, such actuating element being arrested in predetermined position by means of the link 61 and stopping arm 57 engaging the periphery of the clutch-ring 24; the spring 73, which normally holds the component parts of the link 62 in abutting position, yielding to permit the stopping arm 58 to ride over the eccentric or projecting portion of the collar 20 adjacent the shoulder 21. It is evidently immaterial whether this projection is gradual as represented in the drawings or abrupt, so long as it affords the shoulder 21 for arresting the recoil resulting from compression of the spring 27 in the stopping of the machine.

Having thus indicated the nature of the invention and the mode of operation thereof, what is claimed is,—

1. In a clutch of the Horton type, an arm constituting a stop-member, an actuating element, an extensible link connecting said arm and actuating element and comprising component parts with an interposed spring tending to draw them together, resilient means constantly tending to throw said actuating element into a predetermined operative position in opposition to the spring of said link, and manual means for forcibly retracting said actuating element in opposition to said resilient means.

2. In a clutch of the Horton type, an arm constituting a stop-member, an actuating element, an extensible link connecting said arm and actuating element and comprising an abutment carried by said arm and a cooperating part connected to said actuating element with an interposed spring for holding them yieldingly in abutting relation, resilient means constantly tending to throw said actuating element into a predetermined operative position in opposition to the spring of said link, and manual means for forcibly retracting said actuating element in opposition to said resilient means.

3. In a clutch of the Horton type, a swinging arm constituting a stop-member, a rotary element provided with a projection to engage said arm, means including a primary spring tending to constantly throw said arm into the path of movement of the projection of said rotary element, and a second spring acting in conjunction therewith for permitting the arm to yield under the action of the primary spring for allowing said arm to ride over the projection of said rotary element, and means for overcoming the force of the primary spring to retract said arm from stopping position.

4. In a clutch of the Horton type, in combination, a reciprocating element constituting a stop-member, a rocking element, an extension link connecting said elements and having component parts resiliently maintained in abutting relation, means for arresting said rocking element in operative position, resilient means constantly tending through the resiliency of said link to throw said rocking element into operative position, and operator-actuable means for turning said rocking element in opposition to said resilient means.

5. In a clutch of the Horton type comprising a collar fixed to the shaft and a clutch member rotatable thereon, said collar and clutch members being provided with oppositely facing stop shoulders, the combination of a pair of pivotally mounted stop arms, resilient means tending to throw said arms into engaging position with the respective shoulders, and means for simultaneously moving said arms out of their respective engaging positions, the positions of one of said arms being positively controlled at all times by said moving means.

6. In a clutch of the Horton type comprising a collar fixed to the shaft, a clutch member rotatable thereon, and a spring interposed therebetween tending to resiliently rotate said collar and clutch member in opposite directions, the combination of oppositely facing stop shoulders on said collar and clutch member, a pair of pivotally mounted stop arms, resilient means tending to throw said arms into engaging position with the respective shoulders, a member pivoted at a fixed point, links pivoted to said member at one end and to the respective arms at the other end for forcing said arms out of engaging position, and operator actuable means for actuating said pivoted member.

7. In a clutch of the Horton type comprising a collar fixed to the shaft, a clutch member rotatable thereon, and a spring interposed therebetween tending to resiliently rotate said collar and clutch member in opposite directions, the combination of oppositely facing stop shoulders on said collar and clutch member, a pair of pivotally mounted stop arms, resilient means tending to throw said arms into engaging position with the respective shoulders, a member pivoted at a fixed point, links pivoted to said member at one end and to the respective arms at the other end for forcing said arms out of engaging position, one of said links being extensible, and operator actuable means for actuating said pivoted member.

8. In a clutch of the Horton type having movable primary and auxiliary stop arms, a support, a yoke slidable relative to said support and carrying said stop arms, a buffer between said yoke and said support, and means for adjusting the resiliency of said buffer.

In testimony whereof, I have signed my name to this specification.

FREDERIC M. CARD.